(12) United States Patent
Chen et al.

(10) Patent No.: US 10,260,568 B2
(45) Date of Patent: Apr. 16, 2019

(54) CONNECTING DEVICE FOR CHAINRING OF BICYCLE

(71) Applicant: GLORY PRECISION INDUSTRY CO., LTD., Fangyuan Township (TW)

(72) Inventors: Chung-Cheng Chen, Fangyuan Township (TW); Chung-Yi Chen, Fangyuan Township (TW); Sheng-Cian Li, Fangyuan Township (TW); Yu-Syong Chen, Fangyuan Township (TW); Yuan-Cheng Chiang, Fangyuan Township (TW)

(73) Assignee: GLORY PRECISION INDUSTRY CO., LTD., Fangyuan Township (TW)

( * ) Notice: Subject to any disclaimer, the term of this patent is extended or adjusted under 35 U.S.C. 154(b) by 161 days.

(21) Appl. No.: 15/376,927

(22) Filed: Dec. 13, 2016

(65) Prior Publication Data

US 2017/0343047 A1 Nov. 30, 2017

(30) Foreign Application Priority Data

May 24, 2016 (TW) .............................. 105116166 A

(51) Int. Cl.
| | |
|---|---|
| *F16D 1/08* | (2006.01) |
| *B62M 1/36* | (2013.01) |
| *B62M 3/00* | (2006.01) |
| *F16H 55/30* | (2006.01) |
| *F16D 1/068* | (2006.01) |
| *B62M 9/10* | (2006.01) |
| *B62M 9/00* | (2006.01) |

(52) U.S. Cl.
CPC ............. *F16D 1/0847* (2013.01); *B62M 1/36* (2013.01); *B62M 3/00* (2013.01); *B62M 9/105* (2013.01); *F16D 1/068* (2013.01); *F16H 55/30* (2013.01); *B62M 9/00* (2013.01)

(58) Field of Classification Search
CPC ........ F16D 1/0847; F16D 1/068; B62M 1/36; B62M 3/00; F16H 55/30
USPC .......................................................... 474/152
See application file for complete search history.

(56) References Cited

U.S. PATENT DOCUMENTS 4,201,120 A * 5/1980 Segawa .................. B62K 19/34
74/594.2
4,711,635 A * 12/1987 Arnce ...................... B62J 31/00
474/152

(Continued)

*Primary Examiner* — William E Dondero
*Assistant Examiner* — Mark K Buse
(74) *Attorney, Agent, or Firm* — Lynette Wylie; Apex Juris, pllc.

(57) ABSTRACT

A connecting device for a chainring of a bicycle is disclosed, including a connecting disc, a shaft, and a crank. The connecting disc is adapted to be engaged with a chainring, and has an axial bore, a bulging portion bulging from a central portion of the connecting disc, and a surrounding portion, which is flat, and surrounds an outer periphery of the bulging portion. The shaft passes through the axial bore to be fixedly engaged with the connecting disc. The shaft has a connecting end. The crank has a connecting end engaged with the connecting end of the shaft, and a bearing end adapted to bear an external force to make the crank rotate around the shaft. Whereby, the amount of materials used to make the connecting device is decreased. At the same time, the manufacturing cost, the size, and the weight of the connecting device are all reduced.

7 Claims, 11 Drawing Sheets

(56) References Cited

U.S. PATENT DOCUMENTS

| | | | | | |
|---|---|---|---|---|---|
| 5,213,550 | A | * | 5/1993 | Wu | B62M 9/105 |
| | | | | | 474/160 |
| 5,644,953 | A | * | 7/1997 | Leng | B62M 3/00 |
| | | | | | 74/594.1 |
| 7,118,505 | B2 | * | 10/2006 | Lee | B62M 9/105 |
| | | | | | 474/160 |
| 7,686,721 | B2 | * | 3/2010 | Tabe | B62M 9/105 |
| | | | | | 474/116 |
| 7,871,347 | B2 | * | 1/2011 | Kamada | B62M 9/10 |
| | | | | | 474/152 |
| 8,840,127 | B2 | * | 9/2014 | Musgrove | B62M 9/04 |
| | | | | | 280/253 |
| 2005/0282672 | A1 | * | 12/2005 | Nonoshita | B62M 9/105 |
| | | | | | 474/161 |
| 2010/0167881 | A1 | * | 7/2010 | Day | B62M 1/36 |
| | | | | | 482/57 |
| 2011/0011202 | A1 | * | 1/2011 | Lin | B62M 3/00 |
| | | | | | 74/594.1 |

* cited by examiner

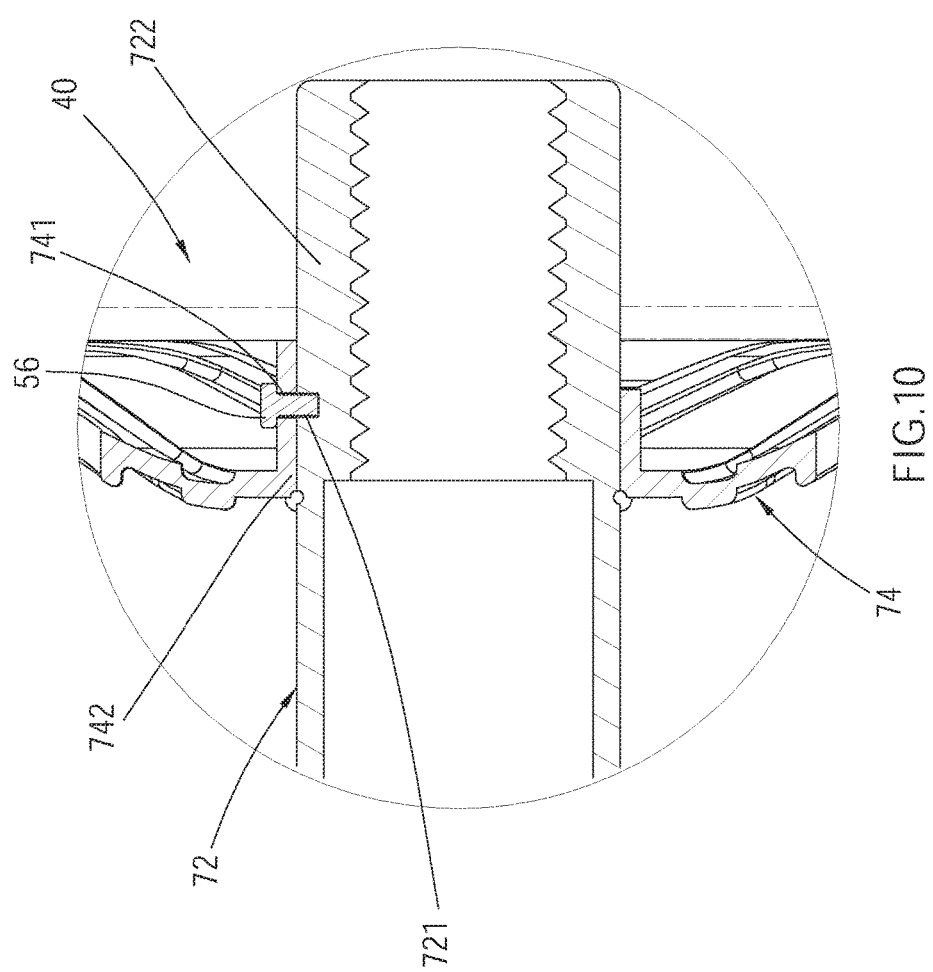

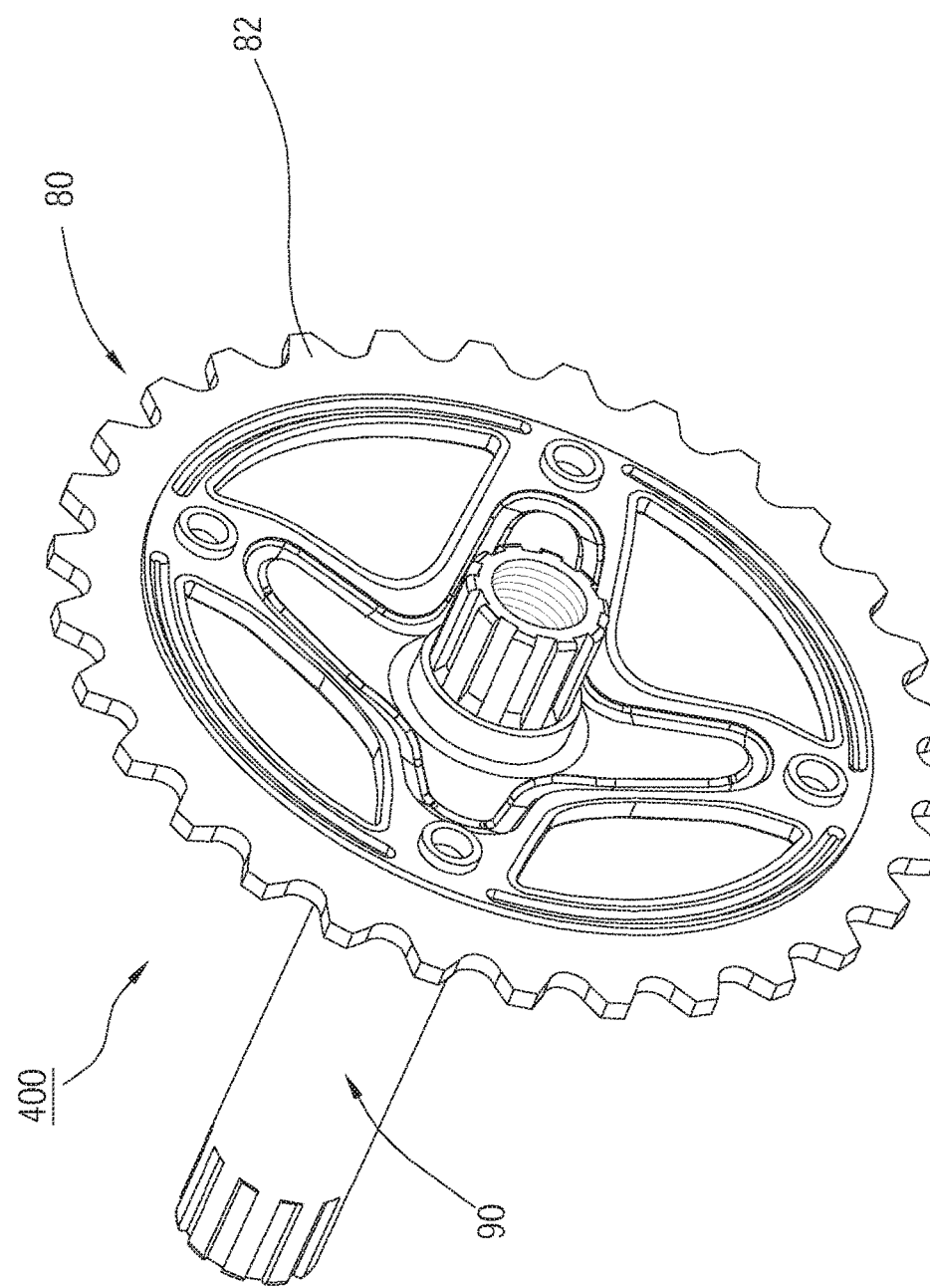

CONNECTING DEVICE FOR CHAINRING OF BICYCLE

BACKGROUND OF THE INVENTION

1. Technical Field

The present invention relates generally to bicycles, and more particularly to a connecting device for a chainring of a bicycle.

2. Description of Related Art

A structural exploded view of a conventional connecting device is shown in FIG. 1, which is used to connect a chainring 3 of a bicycle, and includes a crank member 2 and a shaft 5. The crank member 2 includes a body 2a and a claw 2b, wherein an end of the body 2a is pivotally connected to a pedal (not shown), while another end thereof is connected to the claw 2b. The claw 2b has a plurality of extending arms 2c, each of the extending arms 2c has a perforation 2d. The chainring 3 is adapted to be surrounded by a chain (not shown), and has a plurality of connecting portions 3a extending toward an axle center of the chainring 3, wherein each of the connecting portions 3a has a bore 3b. The crank member 2 and the chainring 3 are fixedly engaged with each other through a plurality of bolts 4a, each of which sequentially passes through one of the perforations 2d and one of the bores 3b to be connected to a nut 4b. An end of the shaft 5 is engaged with the claw 2b at a central location thereof in a manner that the shaft 5 is unmovable relative to the crank member 2.

With the aforementioned connecting device 1, the crank member 2 and the chainring 3 can be driven to rotate around the shaft 5 synchronously by pressing the pedal, whereby the wheels of the bicycle are indirectly driven to rotate through the chain, which drives the bicycle to move forward.

However, since the body 2a and the claw 2b of the conventional crank member 2 are integrally formed and solid, the crank member 2 is bulky, and therefore is not convenient for package and delivery. Furthermore, the heavy crank member 2 adds too much weight to the bicycle, which becomes an unnecessary burden for a rider. Moreover, the crank member 2 is not easily made, and many waste materials are generated during the manufacturing process, which is wasteful, and leads to higher manufacturing cost.

Therefore, designing a connecting device which has a lower manufacturing cost, a smaller size, and a lighter weight has become a major goal in the industry.

BRIEF SUMMARY OF THE INVENTION

In view of the above, the primary objective of the present invention is to provide a connecting device for a chairing of a bicycle, which could lower the manufacturing cost, reduce the size, and decrease the weight.

The present invention provides a connecting device for a chainring of a bicycle, wherein the connecting device includes a connecting disc, a shaft, and a crank. The connecting disc has an axial bore, and the shaft passes through the axial bore to be fixedly engaged with the connecting disc.

With such design, the manufacturing cost could be lowered, and the size and weight could be reduced as well.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 10 is a sectional view along the 10-10 line in FIG. 9, showing the connecting disc and the shaft are engaged through the bolt; and FIG. 11 is a schematic view of a fourth embodiment of the present invention.

DETAILED DESCRIPTION OF THE INVENTION

Figure 1:
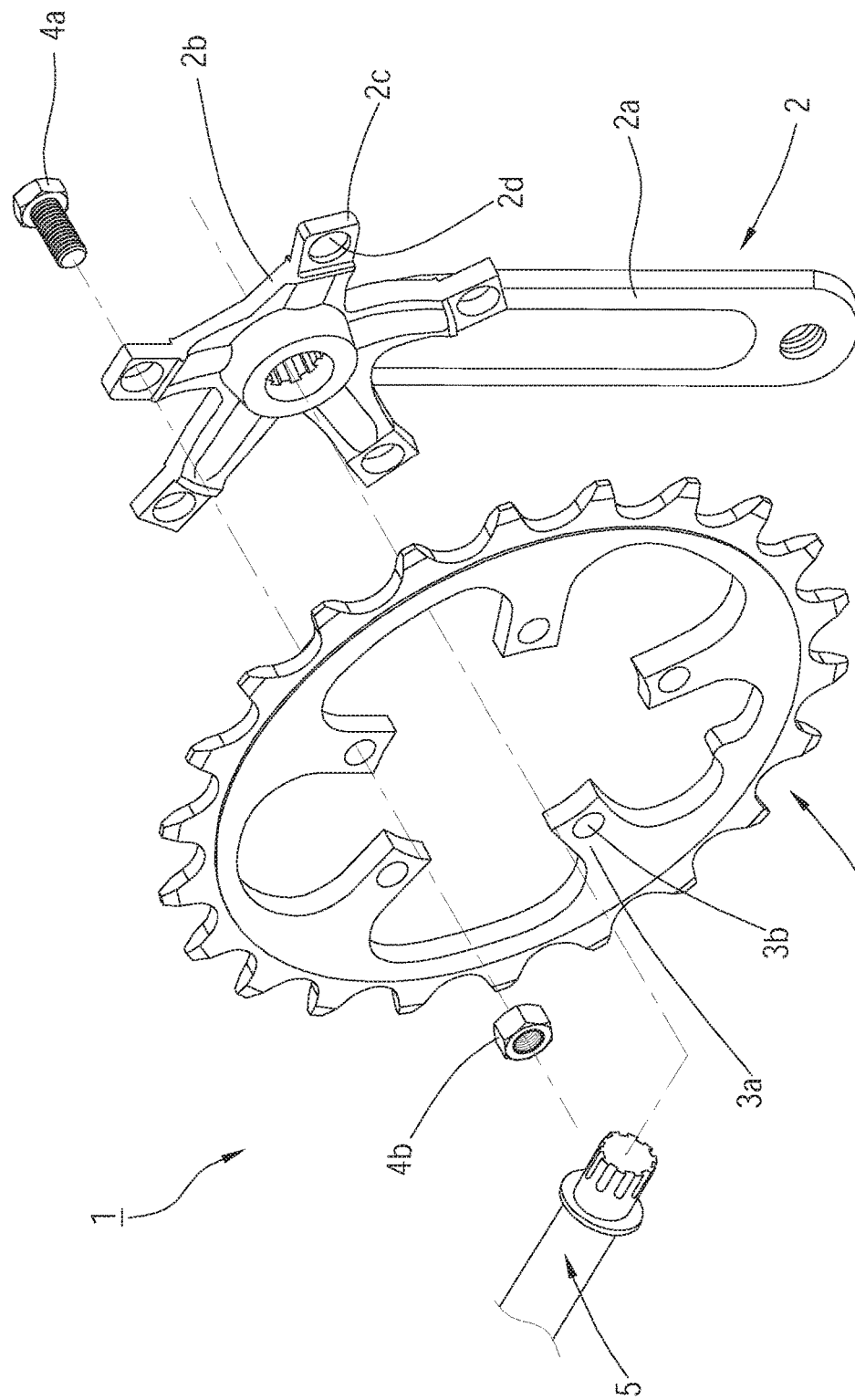
FIG. 1 is a schematic view of a conventional connecting device for a chainring of a bicycle.
Figure 2:
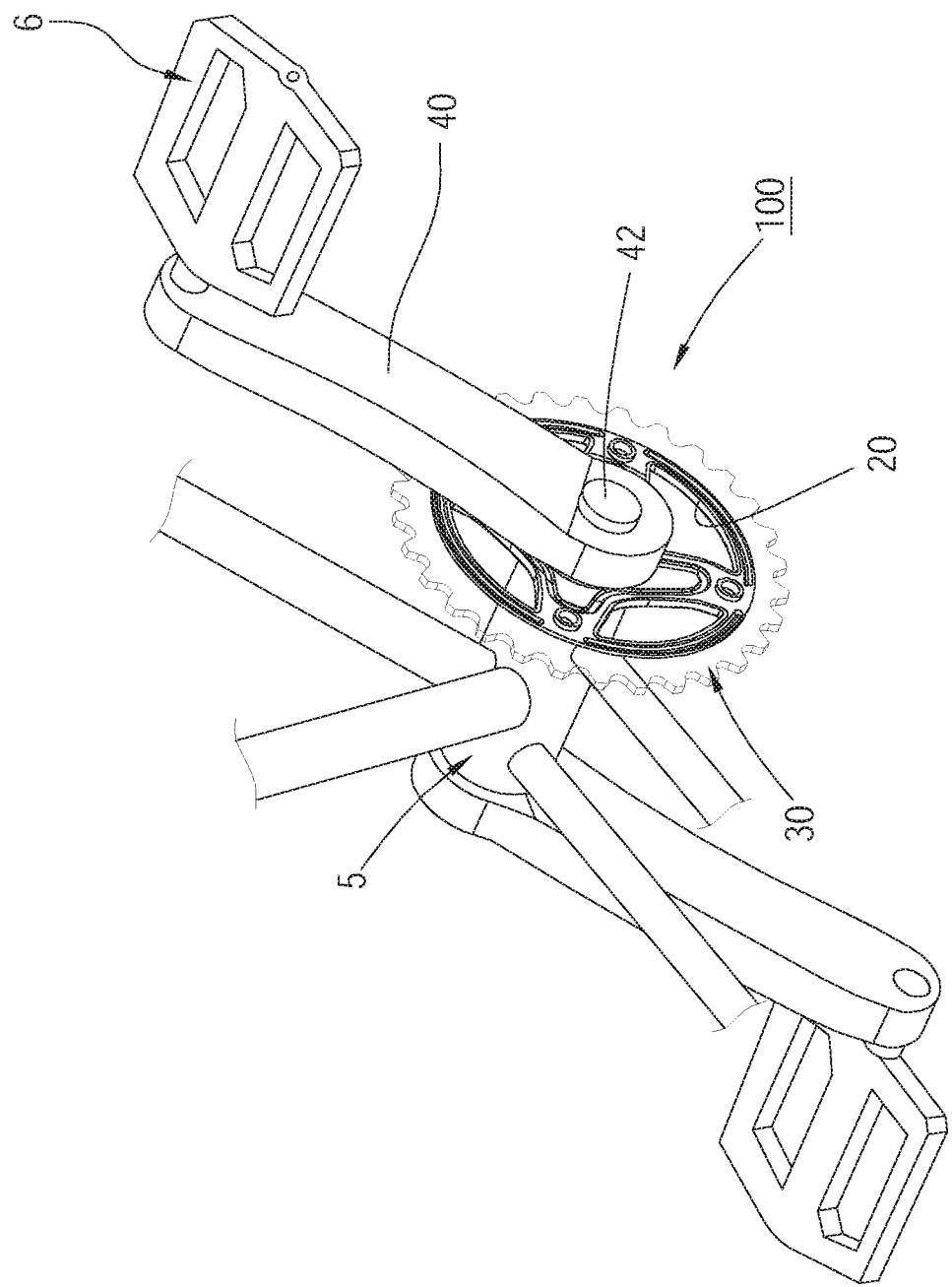
FIG. 2 is a schematic view of a first embodiment of the present invention.
Figure 3:
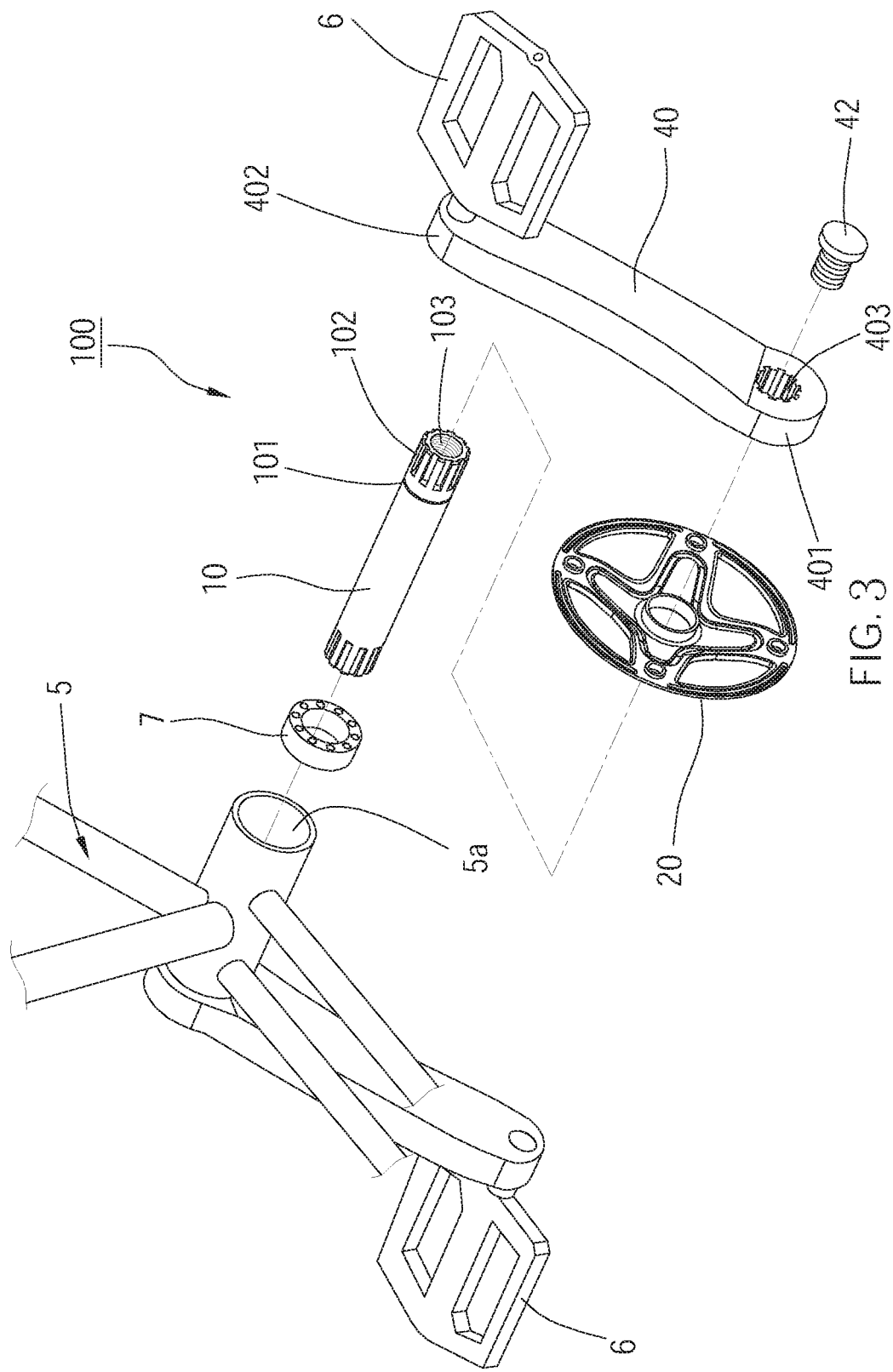
FIG. 3 is an exploded view of FIG. 2.

Part of a bicycle which is applied with a connecting device 100 of the first embodiment of the present invention is shown in FIG. 2 and FIG. 3, wherein the bicycle includes a bottom bracket 5, two pedals 6, two bearings 7, a chainring 30, and a crank 40, wherein the bearings 7 are located in a receiving chamber 5a of the bottom bracket 5.

The connecting device 100 is engaged with the bottom bracket 5, and includes a shaft 10 and a connecting disc 20. The shaft 10 is provided in the receiving chamber 5a of the bottom bracket 5, and has a first circular groove 101 recessed into an outer surface of the shaft 10, a connecting end 102, and a threaded hole 103 recessed into an end surface of the shaft 10. The connecting end 102 is an outer toothed segment formed on the outer surface of the shaft 10. Each of the bearings 7 respectively fits around one end of two ends of the shaft 10, so that the shaft 10 could be rotated smoothly in the receiving chamber 5a.

Figure 4:
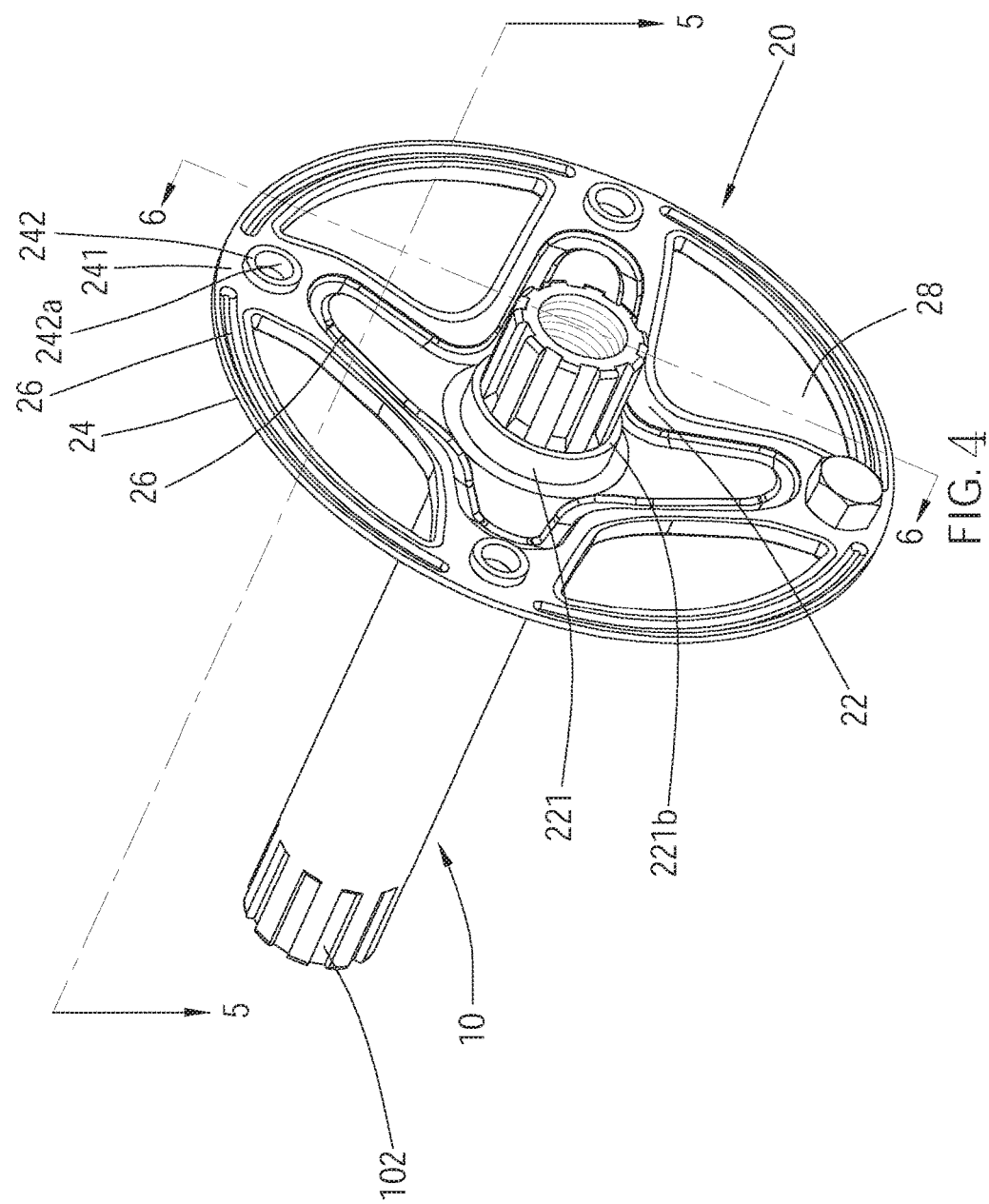
FIG. 4 is a perspective view, showing the structural characteristics of the connecting disc and the shaft.
Figure 5:
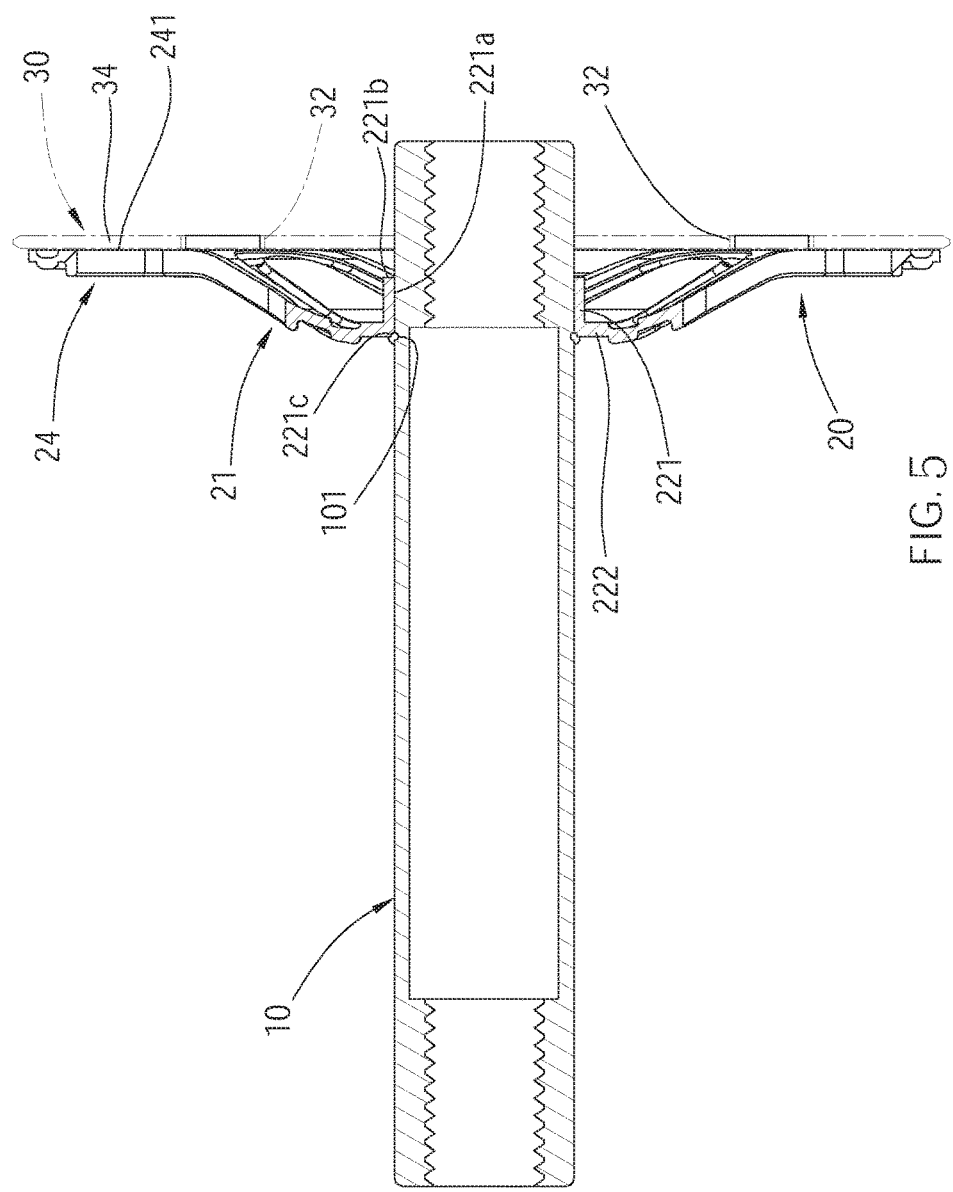
FIG. 5 is a sectional view along the 5-5 line in FIG. 4, showing the groove wall of the first circular groove of the connecting disc is connected to the groove wall of the second circular groove of the shaft.

As shown in FIG. 4 and FIG. 5, the connecting disc 20 is a thin disc made by stamping, which is small and light. The connecting disc 20 has a bulging portion 22 and a surrounding portion 24 surrounding an outer periphery of the bulging portion 22. The bulging portion 22 is bulging from a central portion of the connecting disc 20 to form a recess on an opposite site of the connecting disc 20, wherein the recess faces the crank 40. The bulging portion 22 has a sleeve 221 and a wall 222, wherein the sleeve 221 is located at a center of the bulging portion 22. The sleeve 221 extends toward the crank 40 in an axial direction of the connecting disc 20, and has an axial bore 221a formed at a center thereof, whereby the shaft 10 is adapted to be disposed in the axial bore 221a.

It is worth mentioning that, an end surface 221b of an end of the sleeve 221 near the crank 40 does not exceed a top surface 241 of the surrounding portion 24. In addition, the sleeve 221 has second circular groove 221c, which is recessed into a bore wall of the axial bore 221a, and is located at an end of the sleeve 221 which is far away from the crank 40 to communicate with the first circular groove 101 of the shaft 10. The wall 222 is protruded from the outer surface of the sleeve 221 in the axial direction, and is located at the end of the sleeve 221 which is away from the crank 40.

Figure 7:
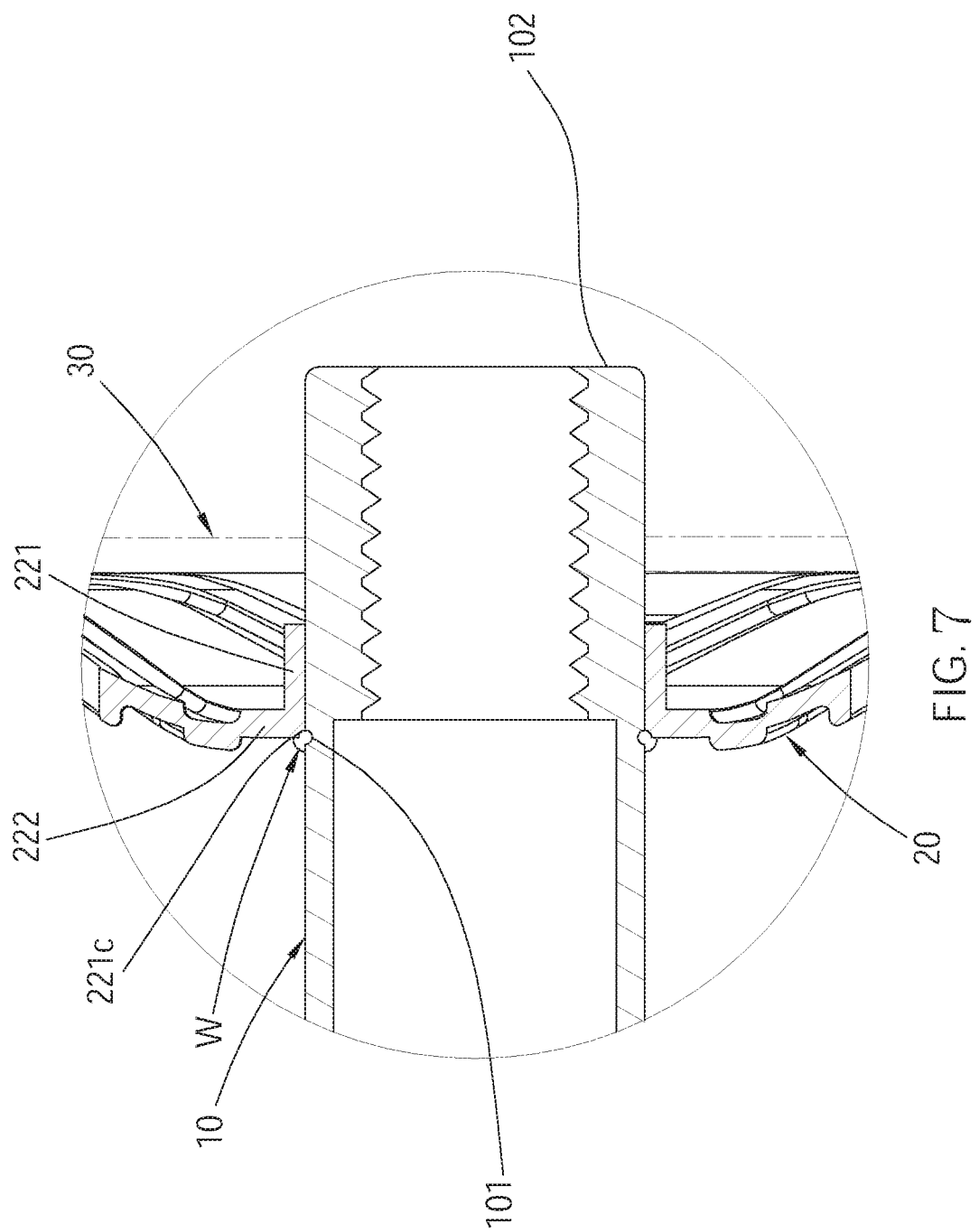
FIG. 7 is a enlarged partial view of FIG. 5, showing the sleeve of the connecting disc extends in the axial direction and surrounds to form the axial bore.

As shown in FIG. 7, in the first embodiment, the shaft 10 and the connecting disc 20 are firmly connected by welding with oxygen-free copper, wherein the first circular groove 101 and the second circular groove 221c are adapted to be filled with a solder W, whereby the contacting area between the solder W and the related components, i.e., the shaft 10 and the connecting disc 20, could be increased, which enhances a bonding strength between the shaft 10 and the connecting disc 20. In addition, with the aforementioned structure, once the shaft 10 passed through the axial bore 221a to be connected to the connecting disc 20, the shaft 10 would be surrounded by the bore wall of the axial bore 221a of the sleeve 221, whereby the shaft 10 could be firmly engaged with the connecting disc 20 to provide a suitable arrangement.

Figure 6:
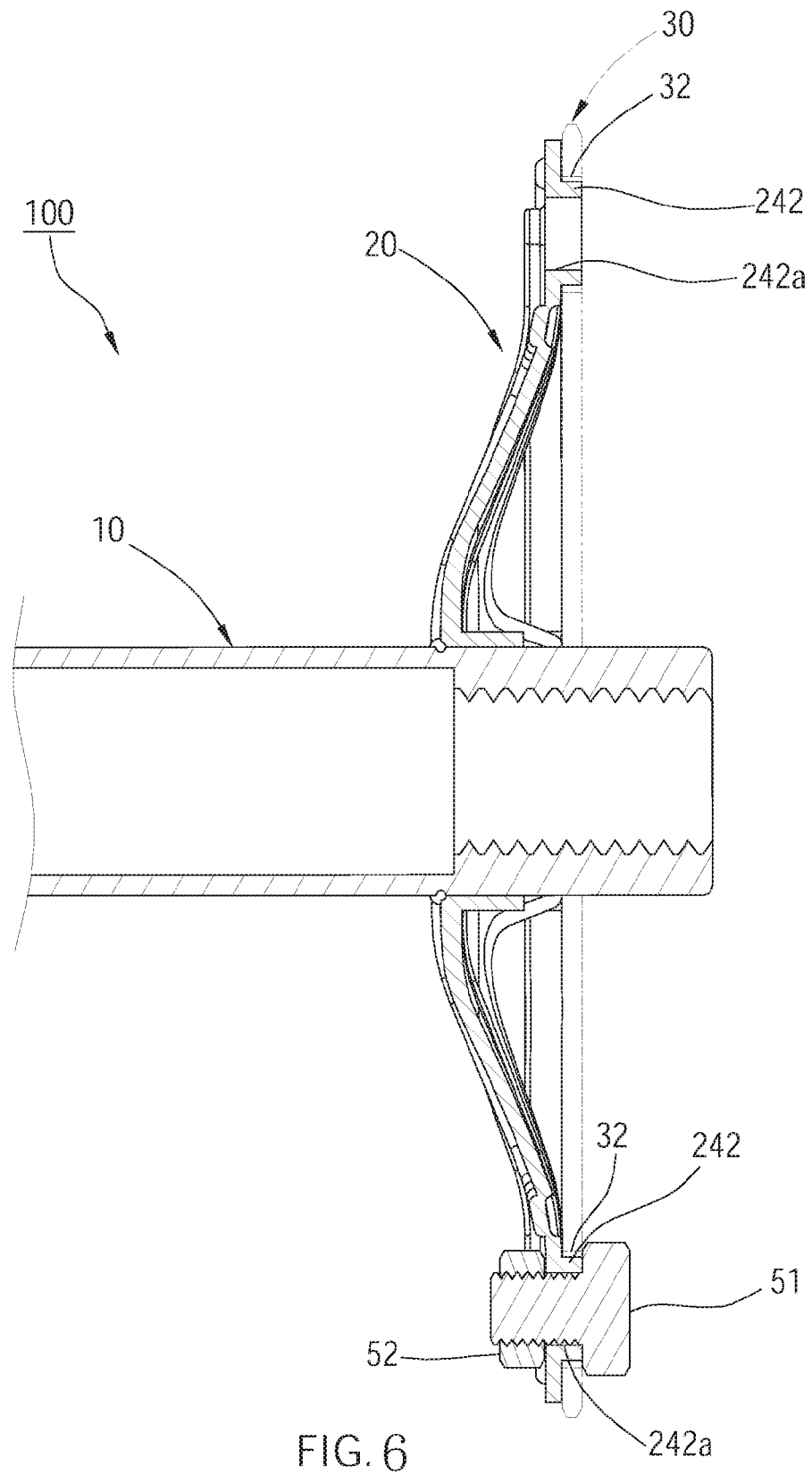
FIG. 6 is a sectional view along the 6-6 line in FIG. 4, showing the chainring and the connecting disc are engaged through the bolt and the nut.

The surrounding portion 24 of the connecting disc 20 is flat, and is adapted to be engaged with the chainring 30. The surrounding portion 24 has a plurality of 242 protruding positioning posts 242, wherein each of the positioning posts 242 has an orifice 242a. The chainring 30 has a plurality of positioning holes 32 corresponding to the positioning posts 242. The purpose of such design is to facilitate the alignment between the chainring 30 and the connecting disc 20 during the process of assembling these components. Furthermore, the chainring 30 could be firmly engaged with the connecting disc 20 through a plurality of bolts 51 and a plurality of nuts 52. For easier illustration, one of the bolts 51 and one of the nuts 52 are taken as an example, which is shown in FIG. 6. When each of the positioning posts 242 of the connecting disc 20 is engaged with one of the positioning holes 32 of the chainring 30, respectively, the bolt 51 passes through the orifice 242a of one of the positioning posts 242 to be fixed by the nut 52, whereby the chainring 30 is firmly engaged with the connecting disc 20. It is worth mentioning that, the end surface 221b of the end of the sleeve 221 near the crank 40 is designed not to exceed the top surface 241 of the surrounding portion 24, which avoids hindering the process of assembling the chainring 30 and the sleeve 221.

Also, the connecting disc 20 further includes a plurality of ribs 26 and a plurality of hollow portions 28, as shown in FIG. 4. The ribs 26 are respectively provided on the bulging portion 22 and the surrounding portion 24 to enhance a structural strength of the connecting disc 20. The hollow portions 28 are located on the bulging portion 22, whereby the amount of materials used to make the connecting disc 20 could be reduced, which makes the connecting disc 20 lighter than a conventional one.

The crank 40 has a connecting end 401, a bearing end 402, and an inner toothed bore 403 located at the connecting end 401. The inner toothed bore 403 of the crank 40 meshes with the connecting end 102 of the shaft 10, and a fixing member 42 (e.g., a bolt) is inserted into the inner toothed bore 403 to be engaged therein, whereby the crank 40 could be firmly engaged with the shaft 10.

With the aforementioned structure of the connecting device 100, the crank 40 could be driven to rotate around the shaft 10 by pressing the pedal 6, which would also drive the chainring 30, the shaft 10, and the connecting disc 20 to rotate.

The connecting device 100 of the first embodiment does not include any shared structures between the connecting disc 20 and the crank 40. Therefore, the connecting disc 20 and the crank 40 could be produced independently. In other words, these two components are not necessary to be made integrally as the conventional ways, which cost more, and generate more waste materials. In addition, the connecting disc 20 is small and light, and could be firmly engaged with the shaft 10 to be connected to the chainring 30. In this way, the manufacturing cost of the connecting device 100 could be lowered, and at the same time, the weight of the connecting device 100 could be reduced as well.

Figure 8:
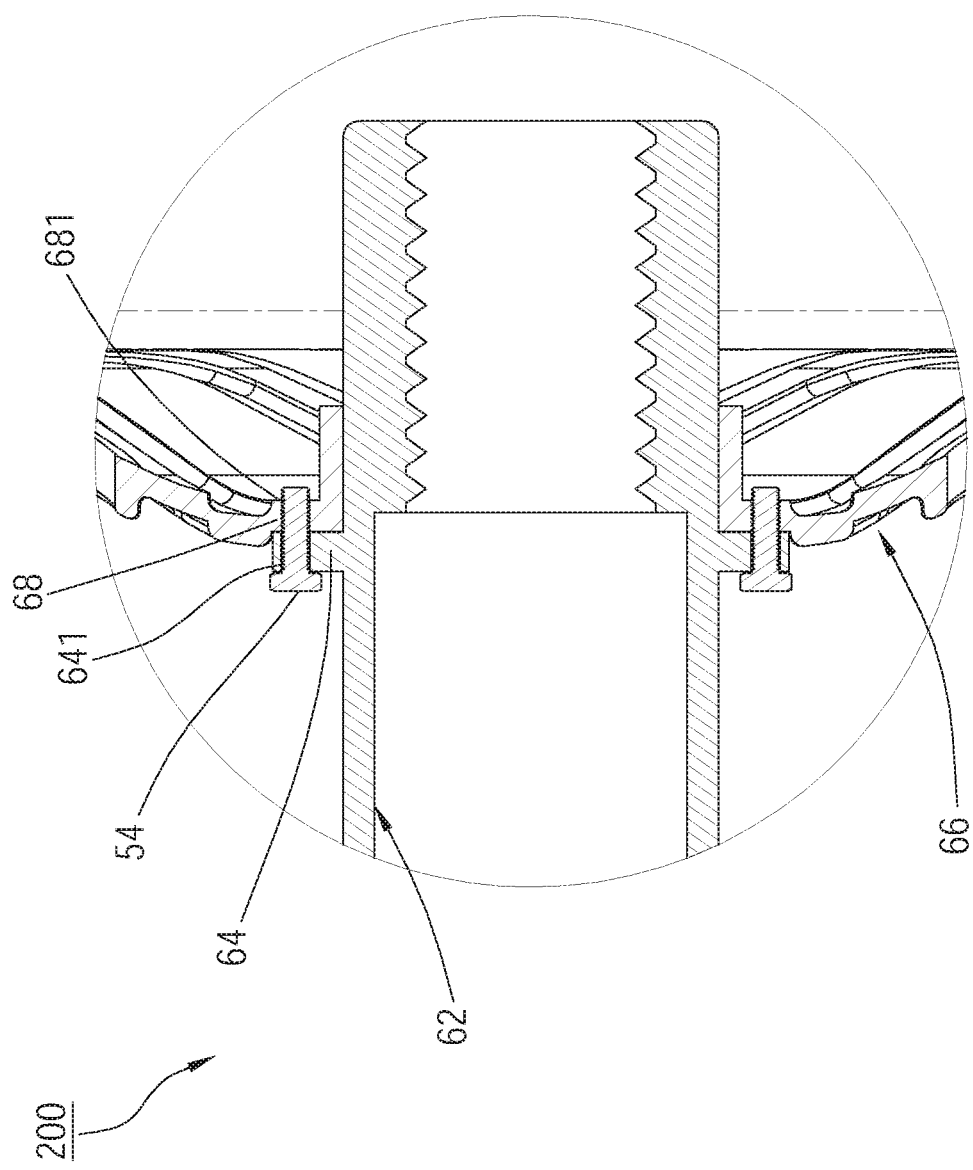
FIG. 8 is a schematic view of a second embodiment of the present invention.

It has to be clarified that, the way of engaging the connecting disc 20 and the shaft 10 is not limited by the above description. A connecting device 200 of the second embodiment is shown in FIG. 8, which substantially has the same structure with the connecting device 100 of the first embodiment, except that the connecting device 200 of the second embodiment further includes at least one restriction member 54, wherein the at least one restriction member 54 includes two bolts. In addition, a shaft 62 of the second embodiment has a flange 64 protruded from an outer surface of the shaft 62, wherein the flange 64 has two perforations 641 formed thereon. A wall 68 of a connecting disc 66 has two threaded holes 681 provided thereon to respectively correspond to one of the perforations 641. When each of the bolts 54 passes through the corresponding perforation 641 to be engaged into a corresponding threaded hole 681, the shaft 62 is engaged with the connecting disc 66. The connecting device 200 of the second embodiment also has the aforementioned advantages of the first embodiment, including providing a smaller size and a lighter weight, and reducing the manufacturing cost thereof.

Figure 9:
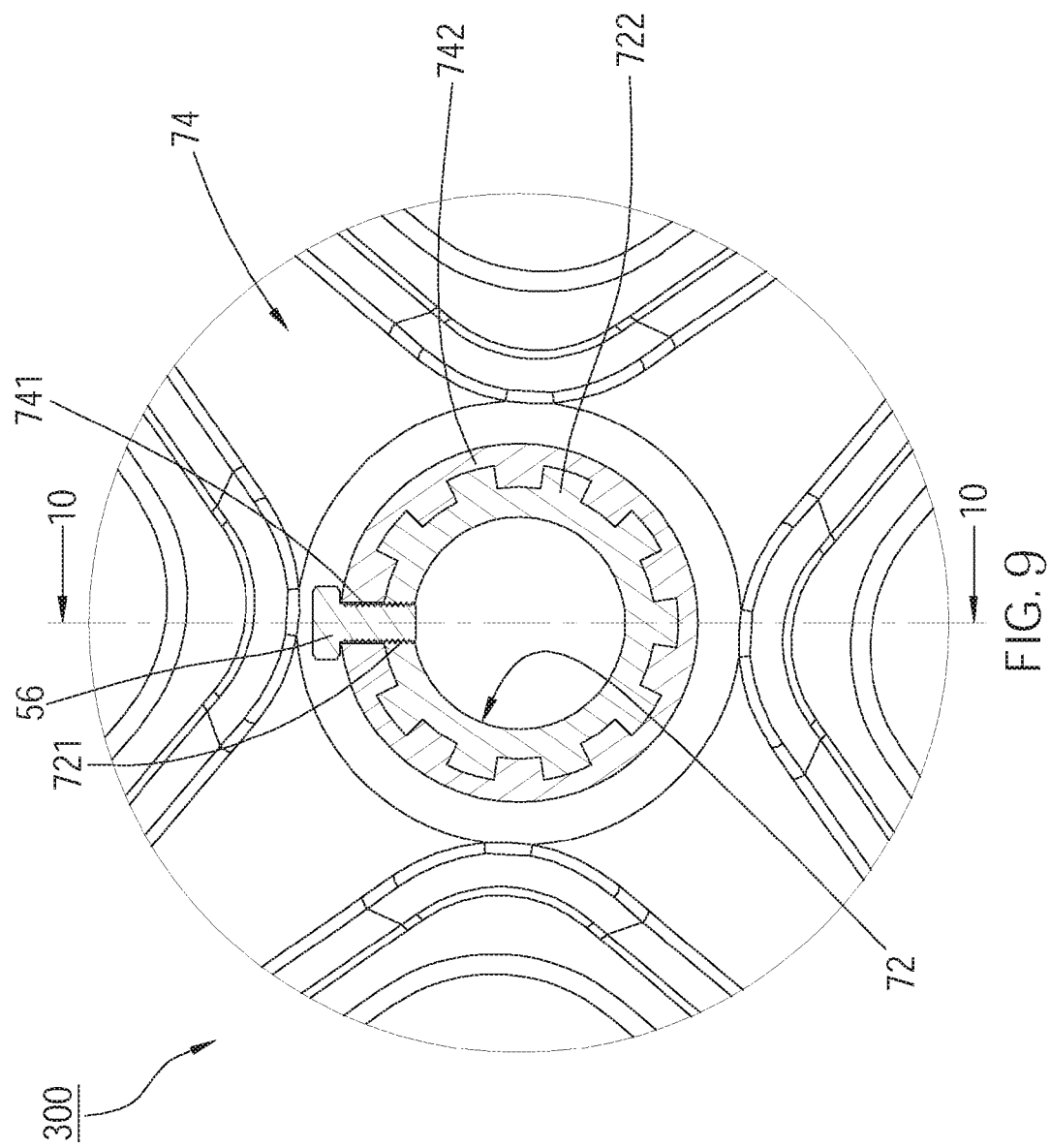
FIG. 9 is a schematic view of a third embodiment of the present invention.

A connecting device 300 of the third embodiment is shown in FIG. 9 and FIG. 10, which substantially has the same structure with the connecting device 100 of the first embodiment, except that a connecting device 300 of the third embodiment further includes at least one restriction member 56, wherein the at least one restriction member 56 include a bolt. In addition, a shaft 72 of the third embodiment has a threaded hole 721, and the shaft 72 has an outer toothed segment 722 provided on an outer surface thereof. The connecting disc 74 has a perforation 741 communicating with the threaded hole 721, and the connecting disc 74 has an inner toothed segment 742 provided on a bore wall of an axial bore thereof, wherein the inner toothed segment 742 is adapted to mesh with the outer toothed segment 722. When the outer toothed segment 722 of the shaft 72 meshes with the inner toothed segment 742 of the connecting disc 74, the shaft 72 is prevented from rotating relative to the connecting disc. The shaft 72 is firmly engaged with the connecting disc 74 with the bolt passing through the perforation 741 to be engaged with the threaded hole 721. The connecting device 300 of the third embodiment could provide the same effects as the connecting device 100, 200 of the above two embodiments.

The connecting discs mentioned in the aforementioned embodiments are adapted to engage with the chainring. However, in other embodiments, the connecting disc could simply be a disc adapted to have a chain provided thereon. A connecting device 400 of the fourth embodiment is shown in FIG. 11, which substantially has the same structure with the connecting device 100 of the first embodiment, also including a connecting disc 80 and a shaft 90 engaged with the connecting disc 80, except that the connecting disc 80 of the fourth embodiment has outer teeth 82 provided around an outer surface thereof, wherein the chain (not shown) could be provided on the outer teeth 82 to indirectly drive the wheels of the bicycle to rotate. In other words, the connecting disc 80 of the fourth embodiment could replace a conventional chainring to provide the same effect of transmission. In addition, according to the way of engaging the chainring and the connecting disc disclosed in the first embodiment, a chainring (not shown) could be further assembled to the connecting disc 80 of the fourth embodiment, whereby the number of the chainrings could be increased, which provides more options for gear shifting.

It must be pointed out that the embodiments described above are only some preferred embodiments of the present invention. All equivalent structures which employ the concepts disclosed in this specification and the appended claims should fall within the scope of the present invention.

What is claimed is:

1. A connecting device for a chainring of a bicycle, wherein the chainring has a plurality of positioning holes, and the bicycle includes a chain; comprising:

a connecting disc, which has an axial bore; and a shaft passing through the axial bore to be fixedly engaged with the connecting disc, wherein the shaft has a connecting end;

wherein the connecting disc has a bulging portion and a surrounding portion; the bulging portion is bulging from a central portion of the connecting disc, and has a sleeve extending in an axial direction of the connecting disc, wherein the sleeve surrounds the axial bore; the surrounding portion is flat, and is provided around an outer periphery of the bulging portion;

wherein the connecting device further comprises at least one restriction member, which passes through the connecting disc and the shaft to fixedly engage the connecting disc and the shaft;

wherein the at least one restriction member comprises at least one bolt, the bulging portion has a wall provided near the sleeve to connect the sleeve, and has at least one threaded hole; the shaft has a flange protruded from the outer surface of the shaft, wherein the flange has at least one perforation provided thereon; the at least one bolt passes through the at least one perforation to be engaged with the at least one threaded hole.

2. The connecting device of claim 1, wherein the surrounding portion has a plurality of positioning posts protruded thereon; the chainring abuts against the surrounding portion, and each of the plurality of positioning holes of the chainring is respectively engaged with one of the positioning posts.

3. The connecting device of claim 2, further comprising a plurality of bolts and a plurality of nuts, wherein each of the positioning posts further has an orifice; one of the bolts passes through the orifice to be fixed by one of the nuts.

4. The connecting device of claim 2, wherein the connecting disc has outer teeth provided on an outer surface thereof; the outer teeth are adapted to be engaged with the chain of the bicycle.

5. The connecting device of claim 1, wherein the connecting disc further has a plurality of ribs, which are respectively provided on the bulging portion and the surrounding portion.

6. The connecting device of claim 1, wherein the shaft has a first circular groove recessed into an outer surface of the shaft, while the connecting disc has a second circular groove recessed into a periphery of the sleeve to communicate with the first circular groove; the shaft and the connecting disc are engaged with each other by soldering, wherein a solder is filled into the first circular groove and the second circular groove.

7. A connecting device for a chainring of a bicycle, wherein the chainring has a plurality of positioning holes, and the bicycle includes a chain; comprising:

a connecting disc, which has an axial bore; and a shaft passing through the axial bore to be fixedly engaged with the connecting disc, wherein the shaft has a connecting end;

wherein the connecting disc has a bulging portion and a surrounding portion; the bulging portion is bulging from a central portion of the connecting disc, and has a sleeve extending in an axial direction of the connecting disc, wherein the sleeve surrounds the axial bore; the surrounding portion is flat, and is provided around an outer periphery of the bulging portion;

wherein the connecting device further comprises at least one restriction member, which passes through the connecting disc and the shaft to fixedly engage the connecting disc and the shaft;

wherein the at least one restriction member include at least one bolt; the shaft has a threaded hole, and an outer toothed segment provided on the outer surface thereof; the connecting disc has a perforation communicating with the threaded hole of the shaft; the connecting disc has an inner toothed segment provided on a bore wall of the axial bore thereof to be engaged with the outer toothed segment; the at least one bolt is engaged with the threaded hole through the perforation.

* * * * *